United States Patent [19]
Hofmeyer et al.

[11] Patent Number: 5,357,802
[45] Date of Patent: Oct. 25, 1994

[54] ROTATING ACCELEROMETER GRADIOMETER

[75] Inventors: Giles M. Hofmeyer, Niagara Falls; Clive A. Affleck, Williamsville, both of N.Y.

[73] Assignee: Textron, Incorporated, Providence, R.I.

[21] Appl. No.: 58,419

[22] Filed: May 7, 1993

[51] Int. Cl.$^5$ ............................................. G01M 1/12
[52] U.S. Cl. .................................................. 73/382 G
[58] Field of Search ............... 73/382 G, 382 R, 510, 73/518, 517 R

[56] References Cited

U.S. PATENT DOCUMENTS 4,188,816 2/1980 Mairson ........................... 73/517 R

OTHER PUBLICATIONS

Forward, "Electronic cooling of resonant gravity gradiometers", *J. of Applied Physics*, vol. 50, No. 1, pp. 1–6, Jan. 1979.

Jekeli, "The Gravity Gradiometer Survey System (GGSS)", EOS, vol. 69, No. 8, pp. 105, 116–117, Feb. 23, 1988.

*Primary Examiner*—Hezron E. Williams
*Assistant Examiner*—Christine K. Oda
*Attorney, Agent, or Firm*—Perman & Green

[57] ABSTRACT

A gravity gradiometer and method for measurement of changes in the intensity of a gravitational field experienced during traversal over earth's terrain, or past a massive object, has a set of eight accelerometers disposed on rotating disc, or on a pair of parallel discs, and arranged uniformly about a central rotational axis of the disc, or of the pair of discs. Each accelerometer develops a signal for maintaining a pendulum in its position of swing along an input axis of the accelerometer. Each input axis, for all of the accelerometers, is perpendicular or parallel to a radius of a disc. The accelerometers are treated as two groups of four accelerometers wherein, in each group, the accelerometers are disposed in pairs about perpendicular diameters of the disc or the pair of discs. Signal processing is accomplished by adding signals of diametrically opposed accelerometers to obtain sum signals and then, in each group, taking the difference between the sum signals and demodulating the difference at twice the rotational frequency. The results of the two groups of signals are combined to give tensor terms which are free of disc rotation frequency.

22 Claims, 6 Drawing Sheets

ROTATING ACCELEROMETER GRADIOMETER

BACKGROUND OF THE INVENTION

This invention relates to a gravity gradiometer for measurement of gravity gradient such as a change in the force of gravity experienced in a traversal over earth's terrain or experienced during passage past a massive object. More particularly, the invention relates to a gravity gradiometer having eight accelerometers disposed on a rotating disc and spaced uniformly around an axis of rotation of the disc to enable combination of measurement signals of the eight accelerometers with cancellation of signal components resulting from a frequency of rotation of the disc.

A gravity gradiometer measures difference in the intensity of a first gravitational field by moving an accelerometer via a circular path between two spaced-apart locations. For example, a gradiometer may be carried by a helicopter to measure features of the earth which affect the intensity and direction of the local gravitational field. Such features may include underground water and mineral deposits, as well as the presence of mountains.

In a typical construction of a gravity gradiometer, plural accelerometers have been carried by a disc rotating about a central axis and having a diameter of, for example, approximately 15 centimeters. An accelerometer is oriented with its input axis perpendicular to a radius of the disc. If the disc were oriented in a plane perpendicular to the surface of the earth, upon rotation of the disc, an accelerometer would pass through one location in the direction of the earth's gravitational field and through a second location 15 centimeters distant from the first location, in the direction opposite to the gravitational field. Upon comparison of the signals outputted by the accelerometer in the first and in the second locations, a difference is noted due to the change in direction of the field relative to the accelerometer input axis, and a further difference may be noted due to a possible change in the magnitude of gravitational field between the first and the second locations.

By using a matched pair of accelerometers disposed on opposite pins of a common diameter of the disc, the two signals of the two locations are provided simultaneously to facilitate their comparison. In addition, combination of the two signals provides for cancellation of any displacement of the apparatus of the gradiometer, including any displacement of a housing enclosing the disk and its attendant electrical circuitry.

The gradient T is measured in terms of difference of gravitational acceleration ($g \sim 980$ cm/sec$^2$) between the foregoing two locations, and the distance between the two locations. The gradient is given by the ratio of the difference of gravitational acceleration to the distance (in centimeters) between the two locations, and is given in terms of the unit Eotvos, wherein one Eotvos = $10^{-9}$ sec$^{-2}$. To obtain a complete description of the gravity gradient, in terms of a tensor, an assembly of three discs rotating about three mutually orthogonal axes is employed. Each disc has carried a set of four accelerometers as described above. However, the number of discs to be employed depends on the nature of the data required. For example, only a single disc rotating about a suitably chosen axis is required to detect a difference in gravitational field brought on by the presence of a massive object.

A problem arises in the situation wherein one tries to increase the rotational rate of the disc. Generally, a relatively slow rate of rotation, such as 15 rpm (revolutions per minute), is suitable for obtaining data as to the earth's terrain from a stationary or nearly stationary vehicle. However, if one were to obtain such data about a massive object, such as a railroad car, passing close to the gradiometer, by way of example, then a higher rotational rate, possibly 50 or 100 rpm, may be required. However, attempts to operate a gradiometer of the foregoing construction at the higher rotational rates has been unsuccessful because of additional signals appearing in the output of the gradiometer, the additional signals being a function of the rotational speed of the disc of the gradiometer. The additional signals tend to mask the desired output of the gradiometer and thereby diminish its utility.

SUMMARY OF THE INVENTION

The aforementioned problem is overcome and other advantages are provided by a gravity gradiometer having a first set of four accelerometers arranged uniformly about an axis of rotation, and positioned symmetrically about a rotational axis such that, in the arrangement of the accelerometers, two opposed accelerometers are disposed on opposite ends of a first diameter of a circular rotational path, and the remaining two opposed accelerometers are disposed at the ends of a second diameter of the rotational path perpendicular to the first diameter. Preferably, the four accelerometers are disposed on a disc which may support also circuitry providing electrical excitation to the accelerometers and extracting signals outputted by the accelerometers. The disc is mounted within a housing which includes a motor for rotating the disc at a predetermined frequency of rotation. The rotational frequency is fixed in a preferred embodiment of the invention.

Electronic circuitry, in accordance with the invention, combines the signals outputted by the four accelerometers to provide an output signal of the first set of accelerometers. The output signal of the first set of accelerometers is demodulated by inphase and quadrature reference signals at twice the rotational frequency to provide output data with respect to a gravity gradient measured by the gradiometer. The mathematical expression for the gradient obtained in this fashion includes a higher order frequency term as a function of the rotational frequency. The invention enables one to measure a more rapidly changing gravity gradient signal without having to increase the gradiometer rotation rate.

Further, in accordance with the invention, the gradiometer includes a second set of four accelerometers mounted for rotation about a rotational axis. Upon rotation of the second set of accelerometers in the presence of a gravitational field, and upon combination of their output signals followed by inphase and quadrature demodulation at twice the rotational frequency, again there is provided data as to the gravity gradient, the mathematical expression for the data including a higher order term as a function of the rotational frequency. By summing together the demodulated signals from the first set of accelerometers and from the second set of accelerometers, the higher order frequency terms cancel so as to provide for gradient data which is independent of the rotational frequency. The cancellation of the unwanted frequency terms is obtained most effectively when the arrangement of the second set of accelerometers is identical to the arrangement of the first set of accelerometers, and wherein the second set of accelerometers and the first set of accelerometers are both coaxial and coplanar. The arrangement of the second set of accelerometers is offset in the circumferential direction by forty-five degrees from the orientation of the first set of accelerometers. In both sets of accelerometers, the input axis of each accelerometer points in the direction of a tangent to the circular path of rotation, and is perpendicular to a radius of the rotating disc.

BRIEF DESCRIPTION OF THE DRAWING

The aforementioned aspects and other features of the invention are explained in the following description, taken in connection with the accompanying drawing wherein.

DETAILED DESCRIPTION

Figure 1:
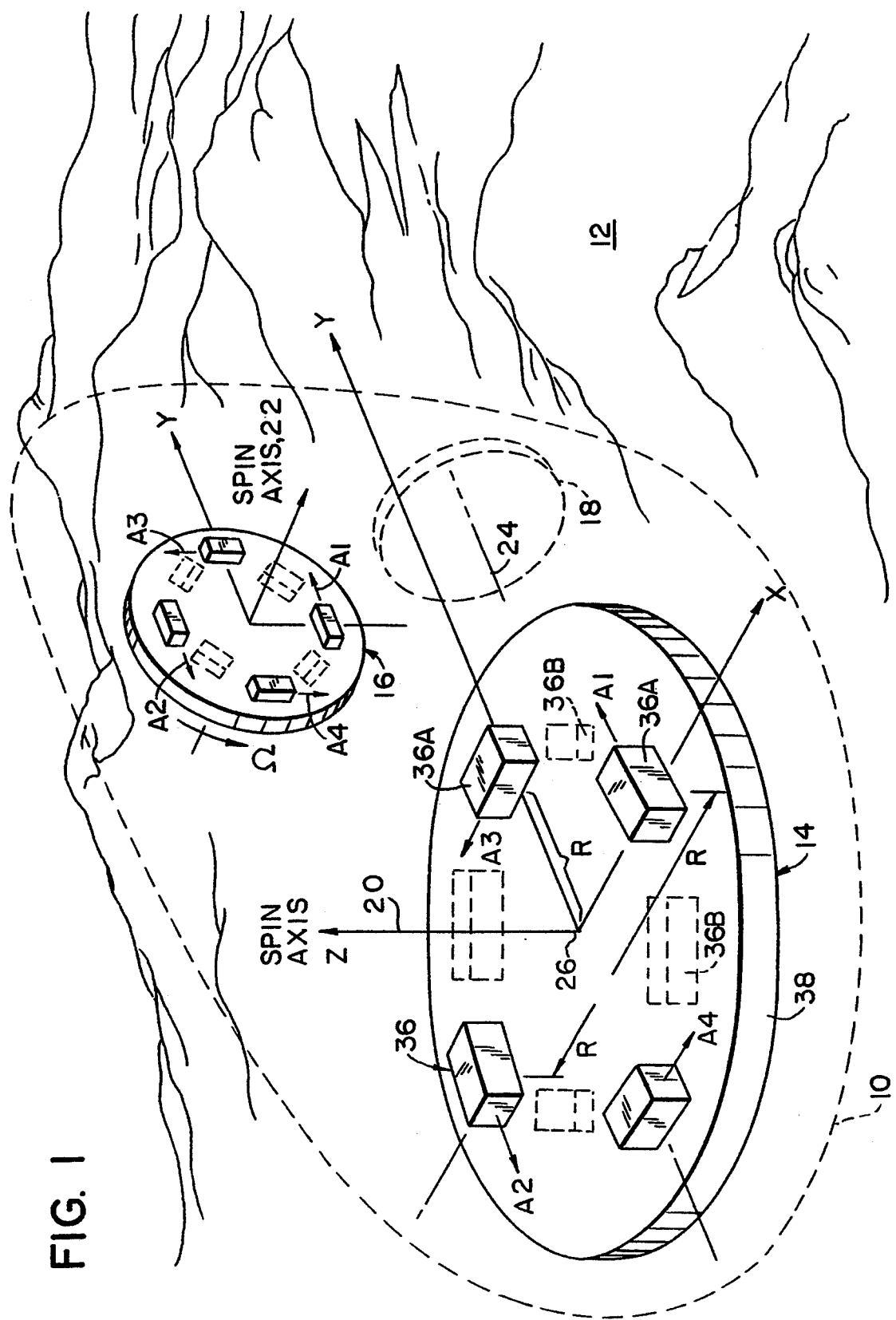
FIG. 1 is a stylized view of plural rotating disc assemblies of a gravity gradiometer traversing a region of the earth's terrain.

FIG. 1 shows a gravity gradiometer 10 traversing the earth's terrain 12. By way of example, the gradiometer 10 may be carried by an aircraft (not shown). The gradiometer 10 comprises three disc assemblies 14, 16, and 18 rotating about spin axes 20, 22, and 24, respectively, wherein details of the disc assemblies 14 and 16 are shown while the third disc assembly 18 is indicated only in phantom. The spin axes 20, 22, and 24 are oriented mutually orthogonally to each other, and are parallel to the three coordinates of an XYZ coordinate system 26. All three of the disc assemblies 14, 16, and 18 have the same construction and, accordingly, only the disc assembly 14 need be described in detail. The three disc assemblies 14, 16, and 18 provide data of the gravity gradient in terms of a tensor having nine components. With respect to the situation depicted in FIG. 1, the gradiometer data described changes in the intensity of the earth's gravitational field during a traversal of the terrain 12 by the gradiometer 10. However, the benefits of the invention can be attained even with a simplified gradiometer having only one disc assembly, as will be described with reference to FIG. 2 and, accordingly, the ensuing description of the invention will be in terms of the structure of only one disc assembly, namely, the disc assembly 14.

Figure 2:
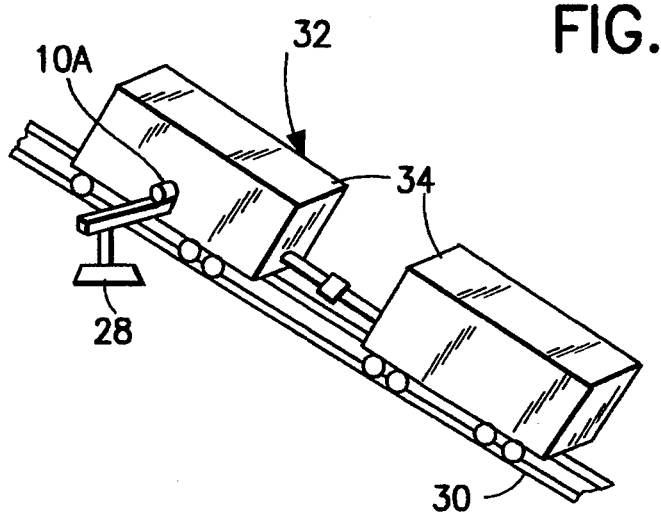
FIG. 2 is a stylized view of a gravity gradiometer of the invention measuring changes in gravitational field presented by moving cars of a freight train.

In FIG. 2, a gradiometer 10A constructed in a manner similar to that of the gradiometer 10 of FIG. 1, but having only a single disc assembly 14, is mounted on a stand 28 located along a railroad track 30 upon which a freight train 32 is traveling. Individual cars 34 of the train 32 pass by the gradiometer 10A. The total mass of each car 34, including its contents, varies depending on the contents of the car 34 such that an empty car provides less of a gravitational field than does a full car. This is particularly true in the case wherein the full car includes a massive structure such as heavy metal equipment. The gradiometer 10A functions in a manner similar to that of the gradiometer 10 in the sense that both measure variations in gravitational field. In the case of the gradiometer 10A of FIG. 2, the spin axis 20 (not shown in FIG. 2) is oriented vertically, perpendicular to the plane of the track 30, and the single disc assembly 14 is operative to provide signals indicating a variation in sensed gravitational field of each car 34 with its contents.

Figure 3:
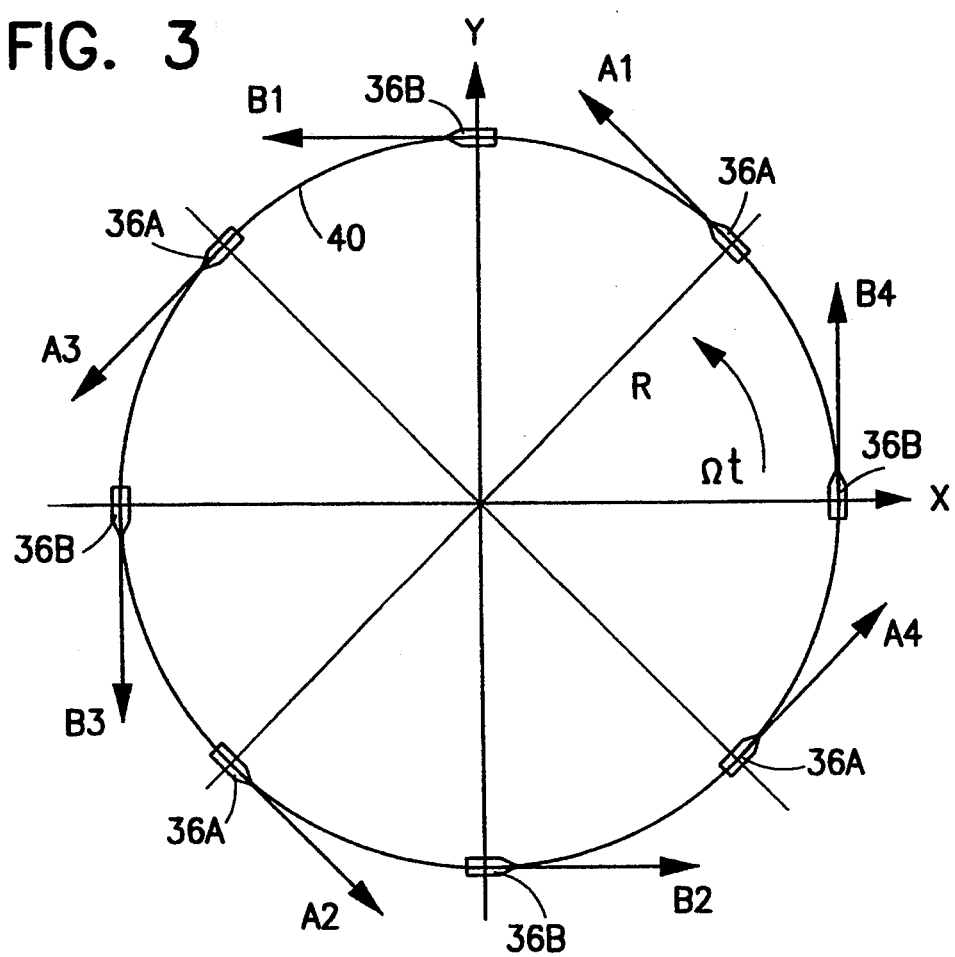
FIG. 3 is a diagram presenting a set of vectors representing input axes of two sets of accelerometers arranged with circular symmetry about a central point, the vectors being oriented in a tangential direction.

With reference to FIGS. 1 and 3, the disc assembly 14 comprises a plurality of accelerometers 36 disposed with circular symmetry about the axis 20, and are uniformly positioned at equal radii R from the axis 20, and are spaced apart with equal spacing in the circumferential direction of forty-five degrees about the axis 20. The disc assembly 14 includes a circular substrate, or disc, 38 which serves to support the accelerometers 36. The axis 20 extends through the center of the disc 38.

The plurality of accelerometers 36 is divided into two groups of accelerometers, namely, a first group of four accelerometers 36A which are drawn in solid lines in FIG. 1, and a second group of four accelerometers 36B which are drawn in phantom in FIG. 1. Each of the accelerometers 36B is located between two of the accelerometers 36A. The locations of the accelerometers 36A and 36B are indicated diagrammatically in FIG. 3 wherein the accelerometers 36A and 36B are shown moving in a counterclockwise direction along a circular path 40 having a radius R extending from the center of the circular path 40. The rate of rotation in radians per second of the accelerometers 36 around the path 40, as well as the rate of rotation of the disc 38 about the spin axis 20, is indicated by $\Omega$, with the angle of rotation indicated by the product $\Omega t$ wherein t is time.

As is well known in the construction of accelerometers, an accelerometer has a mass which is pivoted, in the manner of a pendulum, and includes a sensor of an offset position of the pendulum along a path of travel. Included with each accelerometer is electronic circuitry which applies an electric signal via an electromagnet to restore the pendulum to its base position and, thereby, constrain the pendulum to a minimal displacement along an input axis of the accelerometer. The electric signal applied to the electromagnet constitutes an output signal of the accelerometer and serves as a measure of the acceleration of the pendulum brought on by any forces, including the force of gravity, which may be applied to the accelerometer. With respect to each of the four accelerometers 36A, FIGS. 1 and 3 show four vectors A1-A4 which are oriented along the direction of the respective input axes of the four accelerometers 36A. A similar set of vectors B1-B4 is shown in FIG. 3 to identify the orientations of the input axes of the four accelerometers 36B. In particular, it is noted that the input axes of each of the eight accelerometers 36A-B (FIG. 3) is oriented perpendicularly to a radius vector, and is directed counterclockwise in the tangential direction along the circular path 40.

Figure 3A:
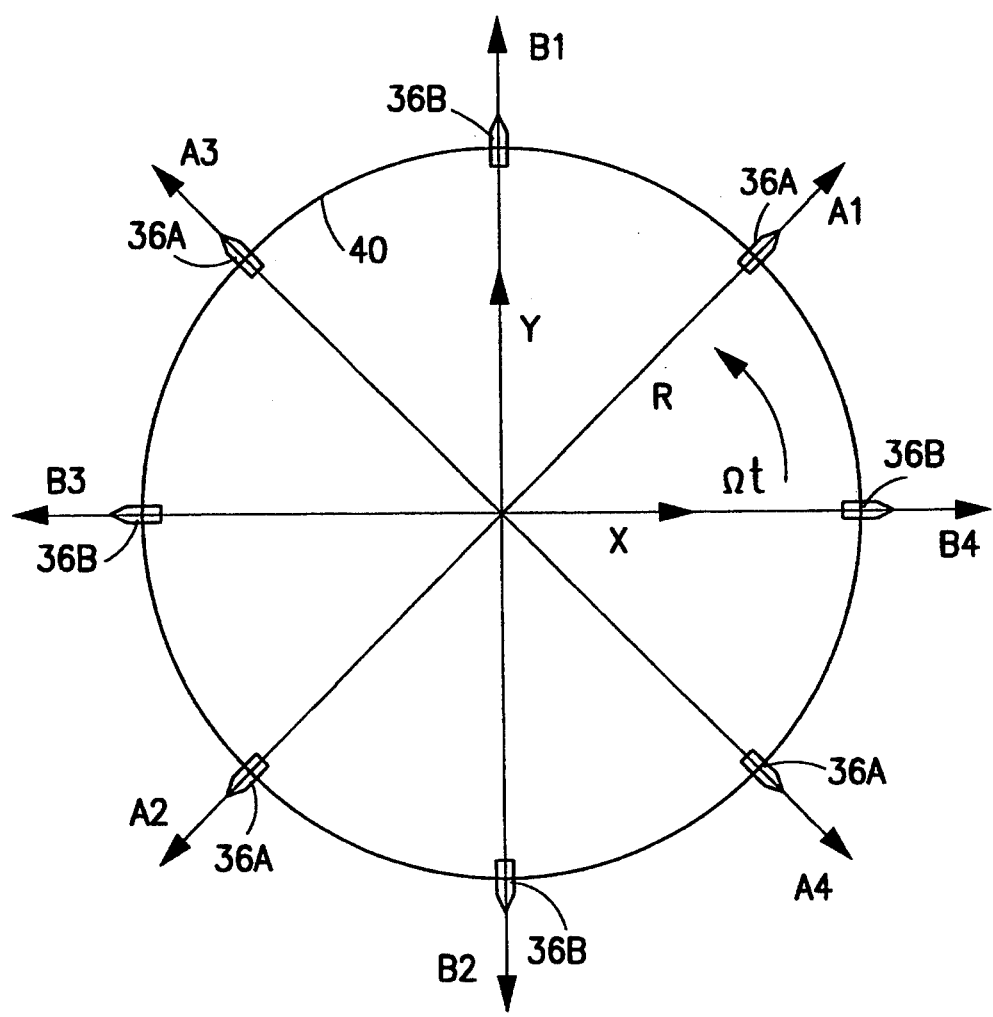
FIG. 3A is a diagram similar to FIG. 3, but with the vectors oriented in a radial direction in accordance with an alternative embodiment of the invention.

In accordance with an alternative embodiment of the invention, as presented diagrammatically in FIG. 3A, the accelerometers 36 (FIG. 1) may be oriented with their input axes and corresponding vectors A1–A4 and B1–B4 directed radially outward (or inward if desired). This alternative arrangement is equivalent to that of FIG. 3 as may be noted by the fact that a description of the operation of the invention, provided in an ensuing mathematical description, applies equally to both arrangements of the two groups of accelerometers 36A and 36B.

In view of the fact that the accelerometers 36A–B are pointing in different directions, an acceleration resulting from a sudden displacement of the disc 38 affects each of the accelerometers differently depending on the direction of its input axis relative to the direction of the displacement acceleration. Also, the presence of a gravitational mass such as a freight car 34 or a portion of the terrain 12 affects each of the accelerometers 36A–B differently based on the relationship between the orientation of the input axis of each accelerometer and the direction of the gravitational force. Accordingly, during rotation of the disc assembly 14 and during a relative movement between the disc assembly 14 and an element of the terrain 12 (FIG. 1) or a freight car 34 (FIG. 2), the signals outputted by each of the accelerometers 36A–B differ. As will be described hereinafter, a combination of the signals outputted by the respective accelerometers of the disc assembly 14 provide data as to the gravitational field while canceling the effects of translatory or rotational movement of the disc assembly 14.

Figure 4:
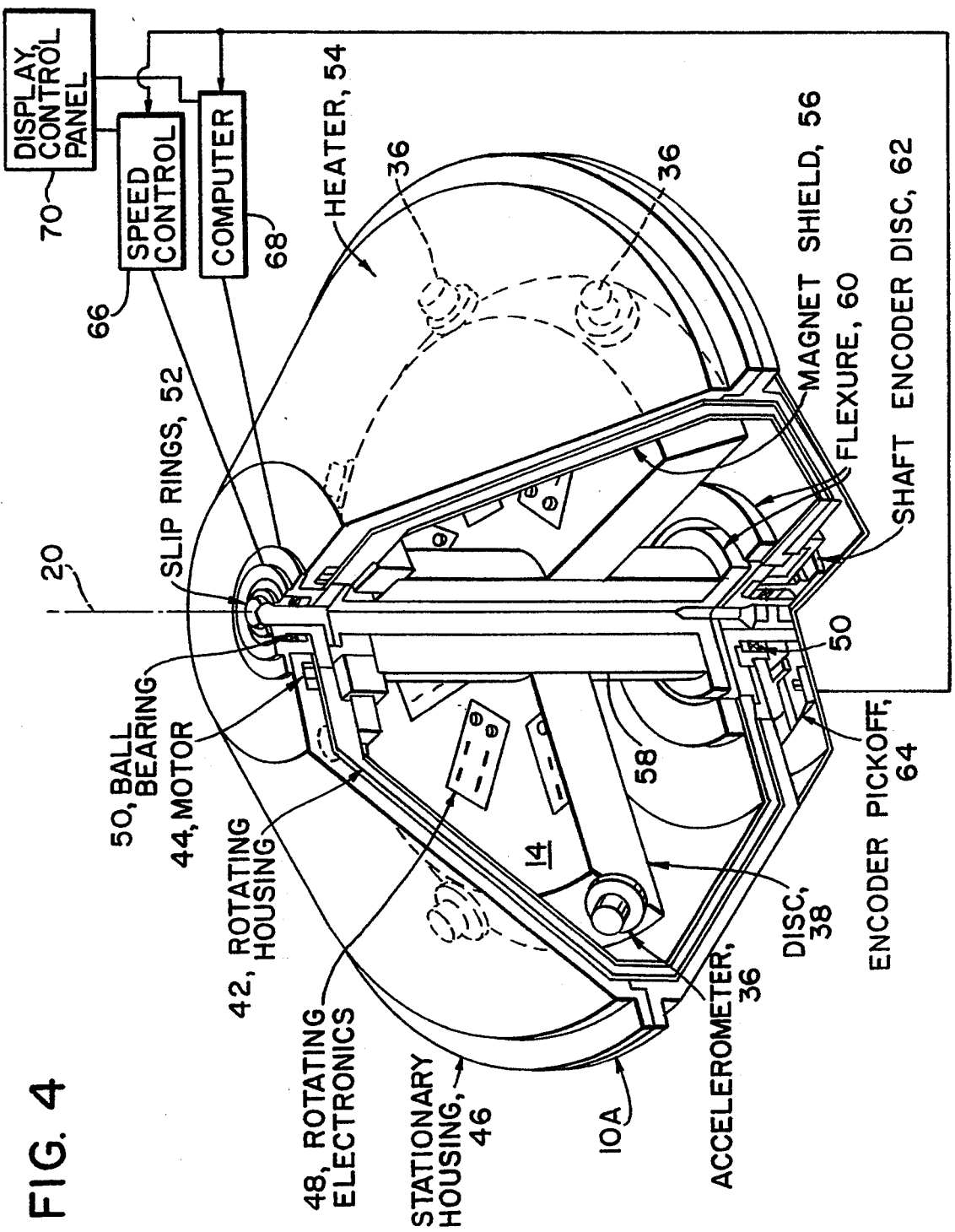
FIG. 4 is a perspective view of a gravity gradiometer of the invention, the view being partially cutaway to disclose interior components of the gradiometer with portions of the view being presented diagrammatically.

FIG. 4 shows details in the construction of the gradiometer 10A (FIG. 2) which comprises the single disc assembly 14 (FIG. 1). As shown in FIG. 4, the disc assembly 14 is supported within a rotating housing 42 which is made to rotate, along with the disc assembly 14, by a motor 44 within a stationary housing 46. The disc assembly 14 includes the disc 38 and the plurality of accelerometers 36, as has been disclosed in FIG. 1, and comprises furthermore electronic circuit modules 48 which rotate with the accelerometers 36 about the spin axis 20. Ball bearings 50 support the rotating housing 42 rotatably within the stationary housing 46. A slip ring assembly 52 disposed in the stationary housing 46, and having brushes (not shown) supported by the rotating housing 42, further enables extraction of electric signals from the disc assembly 14, and also provides for application of electric power to the circuit modules 48 and the accelerometers 36 from an external source of power (not shown). Electrical wiring and other conductors between the accelerometers 36, the electronic modules 48, the motor 44, the slip ring assembly 52, and the encoder pickoff 64 have been deleted to simplify the drawing.

A heater 54 disposed on the stationary housing 46 maintains a constant temperature environment within the stationary housing 46 so as to ensure precision in the measurement of the accelerometers 36. A magnetic shield 56 is disposed along the inner surface of the rotating housing 42 to shield the electromagnets (not shown) of the accelerometers 36 from outside magnetic fields and, thereby, ensure precision to the measurements of the accelerometers 36. A central post 58 supports the disk 38 between top and bottom portions of the rotating housing 42, and makes contact with the top and the bottom portions of the rotating housing 42 by means of flexure assemblies 60 which mechanically insulate the disc assembly 14 from any vibrations which may be present in the bearings 50 and the motor 44. Also included in the gradiometer 10A is a shaft angle encoder having a shaft encoder disc 62 which is mechanically connected to an end of the post 58 for rotating therewith, and a stationary encoder pickoff 64 secured to the stationary housing 46 for providing electrical signals indicating increments of rotation of the disc assembly 14 relative to the stationary housing 46, and for providing a reference signal indicating a rotational angle of zero degrees between the disc assembly 14 and the stationary housing 46.

In the operation of the gradiometer 10A, a speed controller 66 applies signals, via the slip rings 52, to the motor 44 to maintain the speed of the motor 44 at a fixed predetermined value. Signals outputted by the encoder pickoff 64 are applied to the speed controller 66 to enable the speed controller 66 to monitor the speed of the motor 44 and, thereby, control the motor speed by way of a feedback control loop. A computer 68 receives signals from the encoder pickoff 64, and is coupled via the slip ring assembly 52 to the circuit modules 48 for combining signals of the accelerometers 36 to extract data of the gravity gradient in a manner to be described hereinafter. If desired, circuitry of the speed controller 66 may be incorporated into the computer 68. The speed controller 66 and the computer 68 connect with a display and control panel 70 which provides for presentation of the gradient data and for inputting a desired rotational speed to the motor 44.

The circuits in each of the modules 48 provide necessary bias signals for operation of the electromagnets in the respective accelerometers 36, and include amplifiers for adjustment of the gains of the signals outputted by the respective accelerometers 36. This provides for equalization of the responses of the accelerometers 36 to acceleration forces and, thereby, ensures accuracy to the gradient data provided by the gradiometer 10A.

Figure 5:
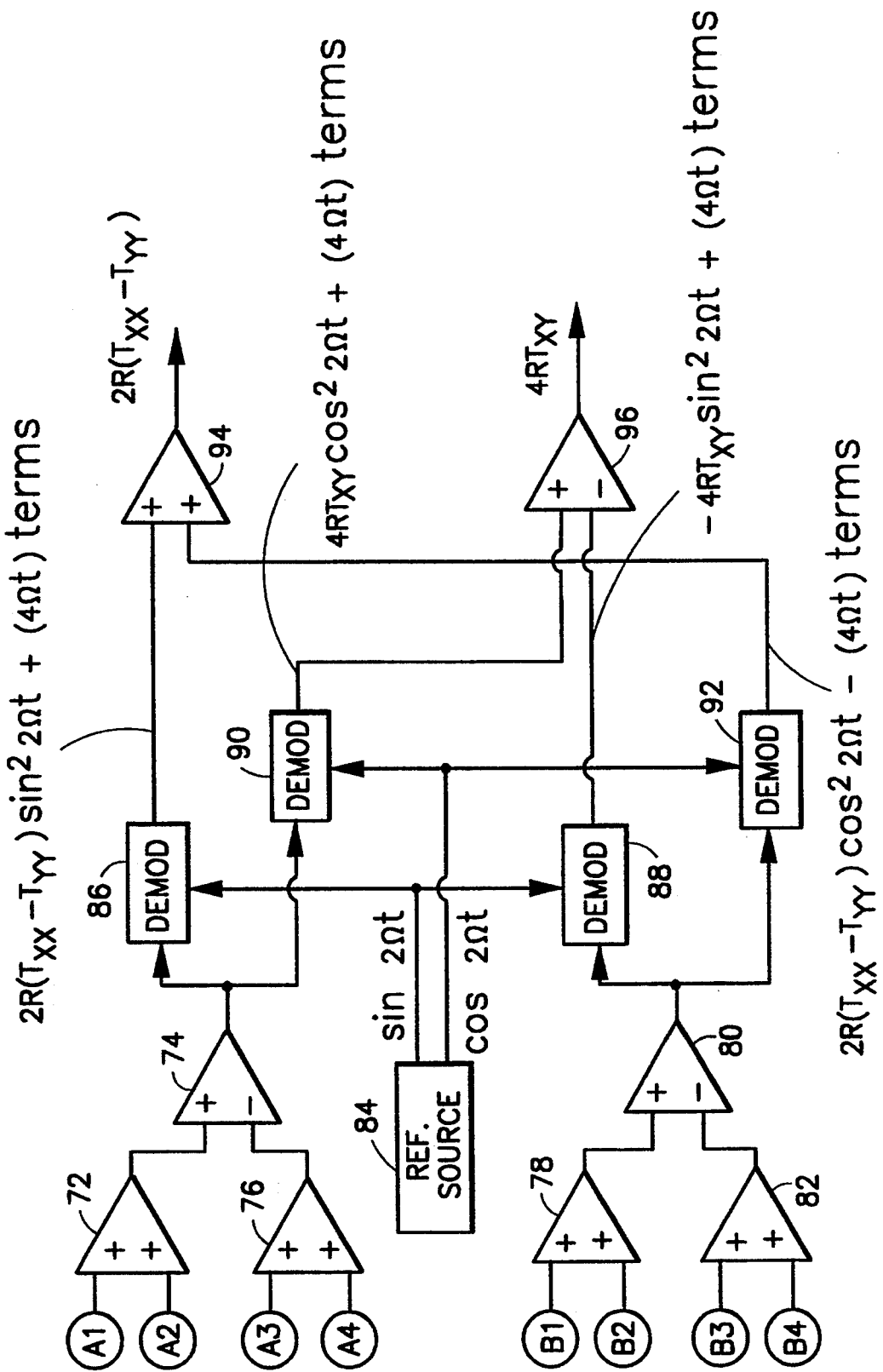
FIG. 5 is a block diagram of mathematical steps in the processing of signals obtained by accelerometers of the gravity gradiometer of the invention.

FIG. 5 shows operation of the computer 68 for extracting gradient data from the signals outputted by the accelerometers 36. As has been shown in FIG. 3, the accelerometers 36A provide for signals represented by the acceleration vectors A1–A4. Similarly, the accelerometers 36B provide for signals represented by the acceleration vectors B1–B4. The accelerometer signals are identified in the same manner in FIG. 5 wherein the four signals of the set of four accelerometers 36A are identified by the legends A1–A4, and the four signals provided by the set of four accelerometers 36B are identified by the legends B1–B4. In FIG. 5, the signals A1 and A2 are summed together via a summing circuit 72 with the sum being applied to the positive input terminal of a subtraction circuit 74. The accelerometer signals A3 and A4 are summed together by a summing circuit 76 with the sum being applied to the negative input terminal of the subtraction circuit 74. The accelerometer signals B1 and B2 are summed together by a summing circuit 78 with the sum being applied to the positive input terminal of a subtraction circuit 80. The accelerometer signals B3 and B4 are summed together by a summing circuit 82 with the sum being applied to the negative input terminal of the subtraction circuit 80. The effect of the summation of signals of diametrically opposed accelerometers 36, as is accomplished by each of the summing circuits 72, 76, 78, and 82, is to cancel the component of acceleration due to a displacement in the disc assembly 14 (FIGS. 1 and 4) in the XY plane of the coordinate system 26.

The gravitational field varies in intensity with location in the XYZ coordinate system 26, both as a function of variations in the terrain 12 of FIG. 1 as well as with distance from a freight car 34 of FIG. 2. Accordingly, each of the summing circuits 72, 76, 78, and 82 output nonzero signals in the operation of the gradiometer 10A of FIG. 2 due to differences in gravitational forces extended by the pendulums of the respective accelerometers 36. Furthermore, due to the rotation of the disc assembly 14 in the XY plane, the signals outputted by each of the summing circuits 72, 76, 78, and 82 vary in a sinusoidal fashion. As noted in Equation (1), the sinusoidal variation occurs at twice the rotational rate of the disc 14. As noted above, the gradient T is defined by the ratio of the difference of acceleration measured by an accelerometer at two spaced-apart locations divided by the spacing between the two locations. The gradient is further identified by subscripts such as Txx, Tyy, and Txy which are three terms of a gradient matrix having a total of nine terms. As has been described hereinabove, the use of the gradiometer 10A with a single disc assembly 14 is sufficient to carry out the purposes of the invention; in which case, there are only three gradient terms of the complete tensor of nine terms. Subtraction by the subtraction circuits 74 and 80 removes the effect of any angular acceleration to the disc assembly 14, as might occur in the event that the motor 44 with its speed control by the controller 66 experiences small variations in rotational speed. Such small variations in rotational speed are to be anticipated in the case of a highly precise speed controller. The output signals of the subtraction circuits 74 and 80 are shown mathematically by the Equations (1) and (4), respectively, which will be described hereinafter.

Signals outputted by the subtraction circuits 74 and 80 are demodulated each with the aid of both inphase and quadrature reference signals at twice the rotational frequency of the disc 38. The reference signals are provided by a source 84 which, by way of example, may include an oscillator (not shown) locked in phase to revolutions of the disc assembly 14 by means of a phase-locked loop (not shown) responsive to signals of the encoder pickoff 64. The inphase reference signal, represented as a sinusoid in FIG. 5, is applied to demodulators 86 and 88 coupled respectively to output terminals of the subtraction circuits 74 and 80, and the quadrature reference signal, represented as a cosinusoid in FIG. 5, is applied to demodulators 90 and 92 connected to output terminals respectively of the subtraction circuits 74 and 80. Output signals of the four demodulators 86, 88, 90, and 92 have the form of squared values of sine and cosine signals. Output signals of the demodulators 86 and 92 are summed together at a summing circuit 94, and output signals of the demodulators 88 and 90 are summed together at a summing circuit 96.

In accordance with a feature of the invention, and as will be explained in the ensuing mathematics, the output signals of the demodulators 86, 88, 90, and 92 include higher frequency components in terms of frequencies equal to four times the rotational frequency of the disc assembly 14. However, gradient data, apart from a scale factor, is given by both the squared sinusoid and the squared cosinusoid components of the demodulated signals. These components sum together at the summing circuits 94 and 96 to provide a DC (direct current) value of the gradient data, along with the higher-frequency components. Low-pass filters 98 and 100 act, respectively, to output signals of the summing circuits 94 and 96 to attenuate the high-frequency components so as to provide the desired DC components of the signals having the gradient data. The gradient data is outputted from the low-pass filter 98 in the form of the expression Txx-Tyy, and from the low-pass filter 100 in the form of the expression Txy. The gradient signals are also proportional to the radius R and, accordingly, a larger gradient signal is obtained by use of a larger disc 38. In the preferred embodiment of the invention, a disc diameter in a range of 20-40 cm (centimeter) is employed. In the terminology for the gradient tensor components, in the subscript xx, the first x refers to displacement along the X coordinate of the coordinate system 26, and the second x refers to the direction in which the force of gravity (or acceleration) is being measured. Similar comments apply to the subscript yy wherein the first y represents offset of the measuring site from the center of the coordinate system 26, and the second y represents the direction which acceleration is being measured. Also, in the subscript xy, the first letter x designates the displacement of the measuring site along the x coordinate of the coordinate system 26, and the second letter y represents the direction in which the acceleration is being sensed.

The foregoing description of the computer 68 (FIG. 4), as set forth in the diagram of FIG. 5, is explained further by the following mathematical description.

With the A set of accelerometers only and for a vertical spin axis the summed accelerometer output $$[(A_1+A_2)-(A_3+A_4)]=2R(T_{xx}-T_{yy})\sin 2\Omega t + 4RT_{xy}\cos 2\Omega t \quad (1)$$

Demodulation at $\sin 2\Omega t$ yields $$2R(T_{xx}-T_{yy})\sin^2 2\Omega t + 4RT_{xy}\sin 2\Omega t \cos 2\Omega t \quad (2)$$

Demodulation at $\cos 2\Omega t$ yields $$4RT_{xy}\cos^2 2\Omega t + 2R(T_{xx}-T_{yy})\sin 2\Omega t \cos 2\Omega t \quad (3)$$

The second B set of accelerometers produce a summed output $$[(B_1+B_2)-(B_3+B_4)]=2R(T_{xx}-T_{yy})\cos 2\Omega t - 4RT_{xy}\sin 2\Omega t \quad (4)$$

Now by demodulating at $\cos 2\Omega t$ we obtain $$2R(T_{xx}-T_{yy})\cos^2 2\Omega t - 4RT_{xy}\sin 2\Omega t \cos 2\Omega t. \quad (5)$$

Adding the resultant signal to the demodulated A set, we obtain the term $$2R(T_{xx}-T_{yy})[\sin^2 2\Omega t + \cos^2 2\Omega t] = 2R(T_{xx}-T_{yy}) \quad (6)$$

Similarly, by demodulating at $\sin 2\Omega t$ we obtain $2R(T_{xx}-T_{yy})\sin 2\Omega t \cos 2\Omega t - 4RT_{xy}\sin^2 2\Omega t \quad (7)$ Subtracting the resultant signal from the demodulated A set, we obtain the term $$4RT_{xy}(\cos^2 2\Omega t + \sin^2 2\Omega t) = 4R T_{xy} \quad (8)$$

The output signals now have a constant value with no limitation associated with rotation rate permitting a selection of rotation rate from considerations other than frequency response. Furthermore, the signal magnitude has been doubled, but rms noise signal has been increased only √2 (since the noise power is doubled) resulting in improved signal to noise ratio.

Figure 6:
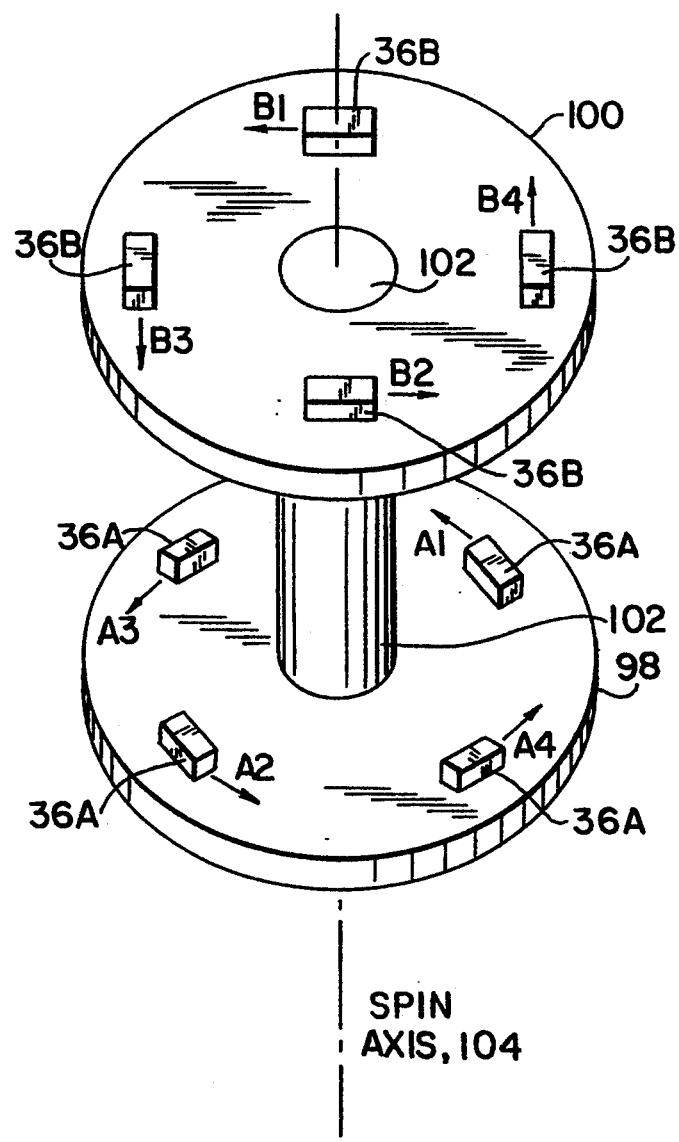
FIG. 6 is a stylized view of an alternative embodiment of the invention wherein accelerometers are mounted on a plurality of discs.

FIG. 6 shows an alternative embodiment of the invention wherein the four accelerometers 36A are mounted on a first planar disc 98, and the four accelerometers 36B are mounted on a second planar disc 100 which is parallel to and spaced apart from the first disc 98. The two discs 98 and 100 are fixed to a shaft 102 which serves to rotate the discs 98 and 100 with their accelerometers 36A and 36B about a spin axis 104. Also shown are the vectors A1-A4 and B1-B4 of the input axes of the accelerometers, these vectors being described previously with reference to FIG. 3. In accordance with the mathematical description, the embodiment of FIG. 6 provides the same result as does the embodiment of FIG. 4.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A gravity gradiometer comprising:
   a first accelerometer set comprising four accelerometers disposed symmetrically about a rotational axis, said four accelerometers of said first set being spaced apart from said other and from said rotational axis;
   a second accelerometer set comprising four accelerometers disposed symmetrically about said rotational axis, said four accelerometers of said second set being spaced apart from each other and from said rotational axis;
   means for rotating said first and said second accelerometer sets at a common rotational frequency about said rotational axis, the second accelerometer set lagging the first accelerometer set by forty-five degrees;
   means for combining signals of said first accelerometer set to output a first set signal, said combining means combining signals of said second accelerometer set to output a second set signal; and
   means for demodulating said first and said second set signals each with inphase and quadrature reference signals at twice the rotational frequency to provide demodulated signals, said gradiometer summing the demodulated signals to obtain a value of gradient independent of the rotational frequency.

2. The gradiometer according to claim 1 wherein said first and said second accelerometer sets are coplanar.

3. The gradiometer according to claim 1 wherein said first and said second accelerometer sets are coaxial.

4. The gradiometer according to claim 1 wherein each of said accelerometers of said first and said second sets has an input axis, the input axes of the accelerometers of both sets being directed in a predetermined direction perpendicular to a tangent to a rotational path of the accelerometer.

5. The gradiometer according to claim 4 wherein all of said accelerometers of said first and said second sets are disposed upon a common circular path of rotation lying in a plane perpendicular to said rotational axis.

6. The gradiometer according to claim 1 wherein said first accelerometer set is disposed on a first plane and said second accelerometer set is disposed on a second plane parallel to and spaced apart from said first plane.

7. The gradiometer according to claim 6 wherein all of said accelerometers of said first set are disposed upon a first common circular path of rotation in said first plane and all of said accelerometers of said second set are disposed upon a second common circular path of rotation in said second plane, said first and said second paths of rotation being disposed about a common rotational axis.

8. The gradiometer according to claim 1 wherein each of said accelerometers of said first and said second sets has an input axis, the input axes of the accelerometers of both sets being directed in a predetermined direction parallel to a tangent to a rotational path of the accelerometer.

9. A gravity gradiometer comprising:
   a disc rotatable about a central axis;
   a first set of four accelerometers disposed on said disc and arranged in a first arrangement with circular symmetry about said axis, each of said four accelerometers of said first set having an input axis, the input axis of each of the accelerometers of said first set being directed in a predetermined direction relative to a radius of said disc intersecting said accelerometer, each of said accelerometers of said first set outputting an accelerometer signal, said four accelerometers of said first set being spaced apart from each other and from said central axis;
   a second set of four accelerometers disposed on said disc and arranged in a second arrangement with circular symmetry about said axis, said second arrangement being rotated forty-five degrees about said axis relative to said first arrangement, each of said four accelerometers of said second set having an input axis, the input axis of each of the accelerometers of said second set being directed in a predetermined direction relative to a radius of said disc intersecting said accelerometer, each of said accelerometers of said second set outputting an accelerometer signal, said four accelerometers of said second set being spaced apart from each other and from said central axis;
   signal processing means for combining the accelerometer signals of said first set of accelerometers to provide a first set signal, said signal processing means combining the accelerometer signals of said second set of accelerometers to provide a second set signal; and
   wherein said signal processing means is operative further to demodulate said first and said second set signals each with inphase and quadrature reference signals at twice the rotational frequency to provide demodulated signals, said signal processing means combining the demodulated signals to obtain a value of gradient independent of the rotational frequency.

10. The gradiometer according to claim 9 wherein said predetermined direction is perpendicular to said radius.

11. The gradiometer according to claim 9 wherein said predetermined direction is parallel to said radius.

12. A gravity gradiometer comprising:
   a first disc and a second disc rotatable about a central axis;
   a first set of four accelerometers disposed on said first disc and arranged in a first arrangement with circular symmetry about said axis, each of said four accelerometers of said first set having an input axis, the input axis of each of the accelerometers of said first set being directed in a predetermined direction relative to a radius of said first disc intersecting said accelerometer, each of said accelerometers of said first set outputting an accelerometer signal, said four accelerometers of said first set being spaced apart from each other and from said central axis;

a second set of four accelerometers disposed on a second disc and arranged in a second arrangement with circular symmetry about said axis, said second arrangement being rotated forty-five degrees about said axis relative to said first arrangement, each of said four accelerometers of said second set having an input axis, the input axis of each of the accelerometers of said second set being directed in a predetermined direction relative to a radius of said second disc intersecting said accelerometer, each of said accelerometers of said second set outputting an accelerometer signal, said four accelerometers of said second set being spaced apart from each other and from said central axis, said first disc being parallel to said second disc;

signal processing means for combining the accelerometer signals of said first set of accelerometers to provide a first set signal, said signal processing means combining the accelerometer signals of said second set of accelerometers to provide a second set signal; and wherein said signal processing means is operative further to demodulate said first and said second set signals each with inphase and quadrature reference signals at twice the rotational frequency to provide demodulated signals, said signal processing means combining the demodulated signals to obtain a value of gradient independent of the rotational frequency.

13. The gradiometer according to claim 12 wherein said predetermined direction is perpendicular to said radius.

14. The gradiometer according to claim 12 wherein said predetermined direction is parallel to said radius.

15. A method of extracting data from a gravity gradiometer comprising a disc rotatable about a central axis, and a first set of four accelerometers disposed on said disc and arranged in a first arrangement with circular symmetry about said axis, said four accelerometers of said first set being spaced apart from each other and from said central axis, each accelerometer of said first set having an input axis, the input axis of each of the accelerometers of said first set being directed in a predetermined direction relative to a radius of said disc intersecting said accelerometer, each of said accelerometers of said first set outputting an accelerometer signal, the method comprising steps of:

arranging a second set of four accelerometers on said disc and in a second arrangement with circular symmetry about said central axis, said second arrangement being rotated forty-five degrees about said central axis relative to said first arrangement, said four accelerometers of said second set being spaced apart from each other and from said central axis, each accelerometer of said second set having an input axis, the input axis of each of the accelerometers of said second set being directed in a predetermined direction relative to a radius of said disc intersecting said accelerometer, each of said accelerometers of said second set outputting an accelerometer signal;

combining the accelerometer signals of said first set of accelerometers to provide a first set signal;

combining the accelerometer signals of said second set of accelerometers to provide a second set signal;

demodulating said first and said second set signals each with inphase and quadrature reference signals at twice the rotational frequency to provide demodulated signals; and combining the demodulated signals to obtain a value of gradient independent of the rotational frequency.

16. The method according to claim 15 wherein said step of arranging includes a step of placing the accelerometers of said first and said second sets along a common coplanar circular path for rotation about said central axis.

17. The method according to claim 15 wherein said predetermined direction is perpendicular to said radius.

18. The method according to claim 15 wherein said predetermined direction is parallel to said radius.

19. A method of extracting data from a gravity gradiometer comprising a first disc rotatable about a central axis, and a first set of four accelerometers disposed on said first disc and arranged in a first arrangement with circular symmetry about said central axis, said four accelerometers of said first set being spaced apart from each other and from said central axis, each accelerometer of said first set having an input axis, the input axis of each of the accelerometers of said first set being directed in a predetermined direction relative to a radius of said first disc intersecting said accelerometer, each of said accelerometers of said first set outputting an accelerometer signal, the method comprising steps of:

arranging a second set of four accelerometers on a second disc, parallel to said first disc, in a second arrangement with circular symmetry about said central axis, said second arrangement being rotated forty-five degrees about said central axis relative to said first arrangement, said four accelerometers of said second set being spaced apart from each other and from said central axis, each accelerometer of said second set having an input axis, the input axis of each of the accelerometers of said second set being directed in a predetermined direction relative to a radius of said second disc intersecting said accelerometer, each of said accelerometers of said second set outputting an accelerometer signal;

combining the accelerometer signals of said first set of accelerometers to provide a first set signal;

combining the accelerometer signals of said second set of accelerometers to provide a second set signal;

demodulating said first and said second set signals each with inphase and quadrature reference signals at twice the rotational frequency to provide demodulated signals; and combining the demodulated signals to obtain a value of gradient independent of the rotational frequency.

20. The method according to claim 19 wherein said step of arranging includes a step of placing the accelerometers of said first and said second sets, respectively, along first and second circular paths on said first and said second discs for rotation about said central axis.

21. The method according to claim 19 wherein said predetermined direction is perpendicular to said radius.

22. The method according to claim 19 wherein said predetermined direction is parallel to said radius.

* * * * *